(12) United States Patent
Sandberg

(10) Patent No.: US 8,584,833 B2
(45) Date of Patent: Nov. 19, 2013

(54) OSCILLATING CONVEYOR

(76) Inventor: Lars Sandberg, Jämshög (SE)

( * ) Notice: Subject to any disclaimer, the term of this patent is extended or adjusted under 35 U.S.C. 154(b) by 0 days.

(21) Appl. No.: 13/508,161

(22) PCT Filed: Nov. 10, 2010

(86) PCT No.: PCT/SE2010/051227
§ 371 (c)(1),
(2), (4) Date: May 29, 2012

(87) PCT Pub. No.: WO2011/059381
PCT Pub. Date: May 19, 2011

(65) Prior Publication Data
US 2012/0234654 A1  Sep. 20, 2012

(30) Foreign Application Priority Data
Nov. 11, 2009 (SE) ........................ 0901437

(51) Int. Cl.
*B65G 25/00* (2006.01)
(52) U.S. Cl.
USPC .................... 198/774.3; 198/750.1
(58) Field of Classification Search
USPC ........... 198/774.3, 764, 759, 750.1, 752, 761, 198/766
See application file for complete search history.

(56) References Cited

U.S. PATENT DOCUMENTS

| | | | |
|---|---|---|---|
| 2,114,153 A | 4/1938 | Sloane | |
| 2,123,685 A | 7/1938 | Sloane | |
| 3,489,263 A * | 1/1970 | Gentry | 198/774.1 |
| 3,753,489 A * | 8/1973 | Tomioka et al. | 198/774.3 |
| 4,174,032 A | 11/1979 | Watkins | |
| 4,220,241 A * | 9/1980 | DeGray | 198/774.3 |
| 4,669,607 A * | 6/1987 | Mason | 198/774.1 |
| 4,865,180 A * | 9/1989 | Brems et al. | 198/774.3 |
| 5,038,918 A | 8/1991 | McRae | |
| 5,076,419 A * | 12/1991 | Solund | 198/774.1 |
| 5,794,757 A * | 8/1998 | Svejkovsky et al. | 198/750.8 |
| 6,079,548 A * | 6/2000 | Svejkovsky et al. | 198/750.8 |

FOREIGN PATENT DOCUMENTS

| | | |
|---|---|---|
| EP | 0372853 A1 | 6/1990 |
| JP | 59053310 A | 3/1984 |

OTHER PUBLICATIONS

International Search Report.

* cited by examiner

*Primary Examiner* — James R Bidwell
(74) *Attorney, Agent, or Firm* — Harness, Dickey & Pierce, P.L.C.

(57) ABSTRACT

An oscillating conveyor includes a support, a conveying element arranged to carry objects to be moved and supported by the support in order to be displaced between a first extreme position and a second extreme position, and a driving device to displace the conveying element. The driving device includes a crank mechanism, which includes a pendulum pin, which in relation to a rotational axis of the crank mechanism is mounted such that, when the crank rotates, at the pendulum pin an angle between the axis of rotation and a first pivot pin varies within an angular range being either obtuse or acute, resulting in the desired displacement of the conveying element at different speeds, the position of the pendulum pin in relation to the rotational axis being adjustable to vary the displacement speed of the conveyor element.

16 Claims, 3 Drawing Sheets

OSCILLATING CONVEYOR

TECHNICAL FIELD

The present is invention concerns an oscillating conveyor, which comprises a support, a conveying element, that is arranged to carry objects to be moved and is supported by the support in order to be displaced to and fro between a first extreme position and a second extreme position, and a driving means, which is arranged on the support in order to displace the conveying element to and fro, wherein the driving means is arranged to displace the conveying element relatively slowly to the first extreme position and to displace it relatively quickly to the second extreme position in order thereby to achieve a movement of the objects in a direction, which corresponds to a displacement direction of the conveying element from the second extreme position to the first extreme position.

Within the manufacturing industry there is often a problem with moving objects from one machining location to a storing location or to another machining location if space is limited. Thus it is difficult, if not impossible, to install an effective rolling or belt conveyor close to an eccentric press or the like, and therefore the objects often have to be moved manually. There have been attempts to use vibrating conveyors, but these have the disadvantage, that their conveying direction suddenly can be reversed, which means that the objects can be brought back to the machining location and thus cause damage. In addition, vibrating conveyors entail very high noise levels.

PRIOR ART

These problems have been eliminated by using so-called oscillating conveyors working in the way described in the preamble. A drawback of the oscillating conveyors known till now has been that they work in a way that makes it difficult to individually adjust their oscillating frequency and stroke to the properties of the objects conveyed, such as weight, size and surface friction.

THE OBJECT OF THE INVENTION

The object of the present invention is therefore to create an oscillating conveyor, in which this drawback has been eliminated and which above that is characterized by a very compact and robust design.

SHORT SUMMARY OF THE INVENTION

According to the invention, at an oscillating conveyor according to the preamble, this is achieved in that the driving means includes a crank mechanism, which includes a crank, which is rotatable about an axis of rotation and comprises a crank pin arranged at a distance from the axis of rotation and in parallel therewith, a connecting rod, which has a first end connected to the crank pin and turning thereabout, and a second end connected to a first pivot pin on a rocker and turning about a pivot axis in parallel with the rotary shaft, and said rocker, which is rotatingly mounted on a pendulum pin in parallel with the axis of rotation and comprising said first pivot pin on a first rocker arm as well as a second pivot pin, which is pivotally connected to the conveying element to cause the desired displacement thereof to and fro, wherein the crank pin, the first pivot pin and the pendulum pin jointly define a triangle, in which, when the crank rotates, the length of the side between the crank pin and the pendulum pin varies, causing an variation of the triangle angles, wherein the pendulum pin is mounted in such a way in relation to the axis of rotation that, when the crank rotates, the angle at the corner of the pendulum pin varies within an angular range being either obtuse or acute, resulting in the desired displacement of the conveying element at different speeds to and fro, and wherein the position of the pendulum pin in relation to the rotational axis is adjustable, thus enabling a variation of the displacement speed of the conveying element.

The whole concept behind the new oscillating conveyor according to invention is based on the creation of a specially designed crank mechanism, which, thanks to the adjustable pendulum pin, provides for easy individual adaptation to the object to be conveyed. Further, thanks to the invention it is rendered possible to use small and relatively low-powered engines, such as compact AC motors, to drive the crank mechanism, wherein these can be "helped running" by setting the pendulum pin to a more easily driven position of the crank mechanism or by a short-time reversal of the rotational direction of a motor.

According to a preferred embodiment, the rocker has a second rocker arm, on which said second pivot pin is provided, wherein both arms of the rocker preferably are arranged at an angle in relation to each other. Both solutions contribute to an optimal geometry when it comes to transferring of a movement pattern of the crank mechanism to the conveying element, and, furthermore, by an appropriate choice of arm lengths and of the angle between these, it is rendered possible to choose a certain ratio between the crank mechanism and the conveying element.

Said second pivot pin is indirectly pivotally connected to the conveying element via a first, inner end of a rod, which has a second, outer end, which is connected to the conveying element. The rod is preferably arranged in such a way by the skilled person that it works substantially in parallel with the displacement direction of the conveying element to and fro and thus significantly facilitates interconnection of the crank mechanism and the conveying element.

Preferably the rod extends on a segment situated between the rod ends through a sleeve, which, in a direction towards the inner rod end, has an orifice, which is dimensioned such that it without collision can take up working movements of the rod traversal to the sleeve, and which, in a direction towards the outer rod end, has a packing box, through which the rod runs in a liquid tight manner. For that, at the end with the orifice, the sleeve suitably is surrounded by a tubular carrier, which resiliently holds the sleeve by means of an O-ring, which is arranged in a corresponding groove on the outside of the sleeve and the inside of the carrier. Both make it very easy to reliably adapt the oscillating conveyor to long time operation with integrated oil lubrication, for which the crank mechanism is arranged in a liquid tight housing, in which there is oil for lubricating of the crank mechanism.

According to a preferred embodiment the pendulum pin is displaceable along a circle arc, which is facing away from said rotational axis and has a circle axis in parallel therewith. Turning of the circle arc as claimed results in an extremely compact design, to which an obtuse angle at the corner of the pendulum pin in the above described triangle contributes too.

Preferably, the pendulum pin is displaceable from the outside of the oscillating conveyor by means of a knob. Thus it becomes easy to provide an appropriate setting of the oscillating conveyor for all sorts of objects to be conveyed without the need of any complicated actions.

In order to allow for extreme variations, in some cases it has proved to be appropriate to make the connecting rod curved, because otherwise the collision problems can arise inside the crank mechanism preventing a desired expansion of the potential displacement area for the pendulum pin.

SHORT SUMMARY OF THE DRAWINGS

The invention will now be described in detail by means of an embodiment example, reference being had to the accompanying drawings.

DESCRIPTION OF A PREFERRED EMBODIMENT

Figure 1:
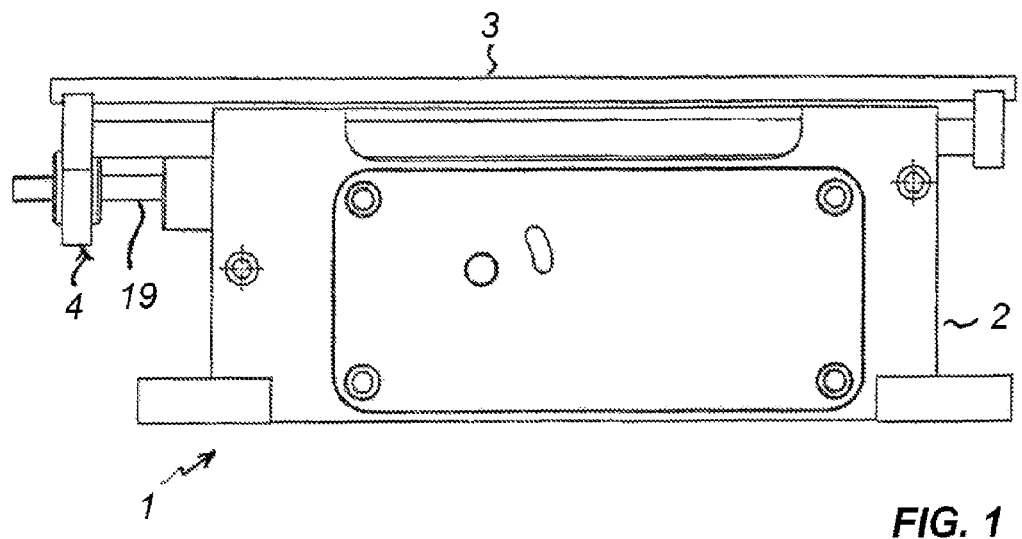
FIG. 1 shows an embodiment of an oscillating conveyor according to the invention in a side view.
Figure 2:
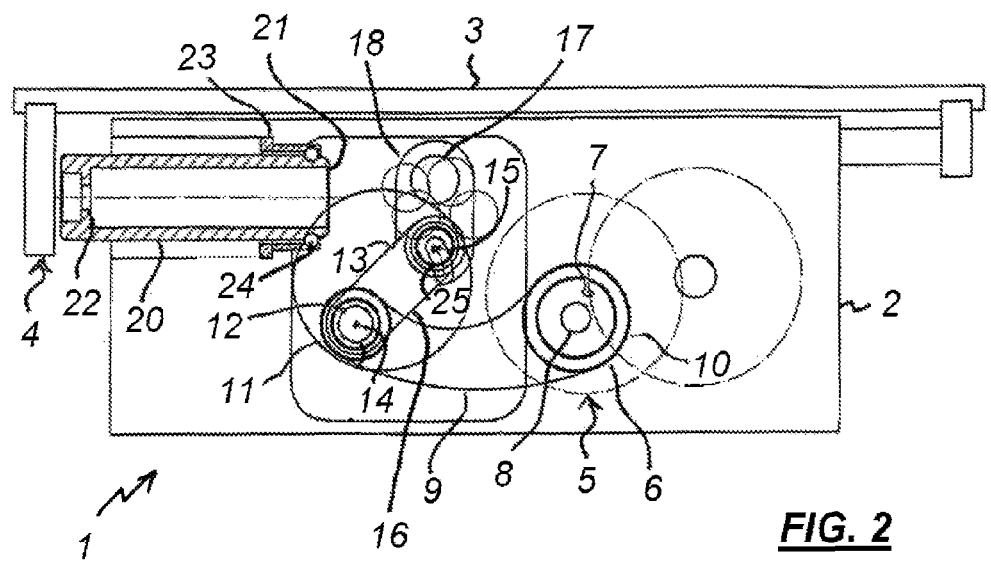
FIGS. 2-6 show the oscillating conveyor in corresponding but more schematic views with some parts removed to better illustrate the technical function.

The embodiment of the oscillating conveyor 1 according to the invention has a support 2, which is intended to be installed for example next to a machine, which subsequently outputs processed objects to be carried away by means of the oscillating conveyor 1. On top the oscillating conveyor 1 has a conveying element 3, which is arranged to carry said objects, usually with the aid of a chute (not shown), and is mounted on the support 2 to be displaced to and fro between a first extreme position and a second extreme position. Of these a left extreme position is shown in FIG. 1 and a right extreme position is shown in FIG. 2. Further possible extreme positions will be dealt with below in conjunction with FIGS. 3-6.

Inside of the oscillating conveyor 1 there is a driving means 4, which is arranged on the support 2 to displace the conveying element 3 to and fro relatively slowly to a first extreme position and relatively quickly to a second extreme position in order thereby to achieve movement of objects in a certain direction, which corresponds to the displacement direction of the conveying element from the second extreme position to the first extreme position. Below we will revert to the placement on the drawings of the first and second extreme position, specifically in conjunction with FIG. 2, to which we refer primarily in the two following paragraphs.

In accordance with the invention, the driving means 4 comprises a crank mechanism 5, which includes a crank 6, which is rotatable about an axis of rotation 7 and bears a crank pin 8 at some distance from and in parallel with the axis of rotation 7. The axis of rotation 7 is defined preferably by the axis of a large gear wheel, for which the outer contour is illustrated by a dotted circle and which is engaged with a small sprocket that is illustrated by a solid circle surrounded by an outer dotted one. Said outer circle is intended to illustrate the overall size of a compact AC motor, which is arranged inside of the oscillating conveyor and, just like said axis of rotation 7, is lying down in relation to the conveying element. According to the invention, the driving means 4 has a crank pin 8, which, as can be seen, is arranged directly on said gear wheel. Also included in the drive means 4 is a connecting rod 9, which has a first end 10, that is connected to the crank pin 8 and is pivoting about it, and a second end 11, that is associated with a first pivot pin 12 on a rocker 13 and is pivoting about it about a pivot axis 14 in parallel with the axis of rotation 7. The rocker 13 is pivotally mounted on a pendulum pin 15 in parallel with the axis of rotation 7 and bears said first pivot pin 12 on a first rocker arm 16, and the addition thereto bears a second pivot pin 17 on a second rocker arm 18. The second pivot pin 17 is pivotally connected with the conveying element 3 for the desired displacement thereof to and fro in a manner described in detail hereinafter.

In accordance with the invention the crank pin 8, the first pivot pin 12 and the pendulum pin 15 together define a triangle, in which, when the crank 6 is rotating, the length of the side between crank pin 8 and pendulum pin 15, and thus the angles of the triangle, varies. In this respect, the pendulum pin 15 in relation to the axis of rotation 7 is placed such that, when the crank 6 is rotating, the angle at the corner of the pendulum pin 15 varies within an either obtuse or acute angular range, resulting in the desired displacement of the conveying element 3 with different speeds to and fro. Furthermore, in accordance to the invention the position of the pendulum pin 15 in relation to the axis of rotation 7 can be set to different positions described below, whereby the displacement speed of the conveying element 3 can be varied because the second oscillation pin 17 thus can be made to occupy many different positions, such as illustrated in FIG. 2 with the aid of several clearly separated circles about the actual pin 17.

Figure 3:
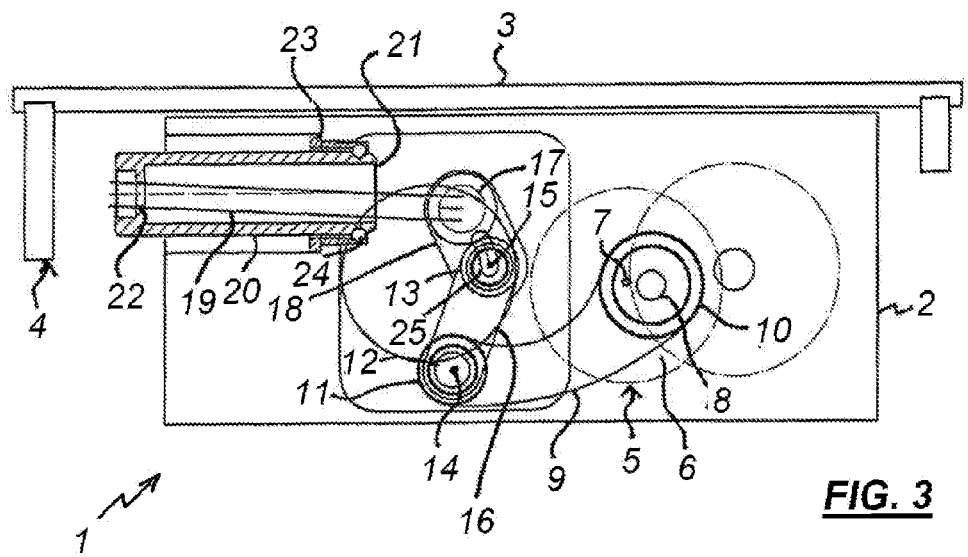
Figure 4:
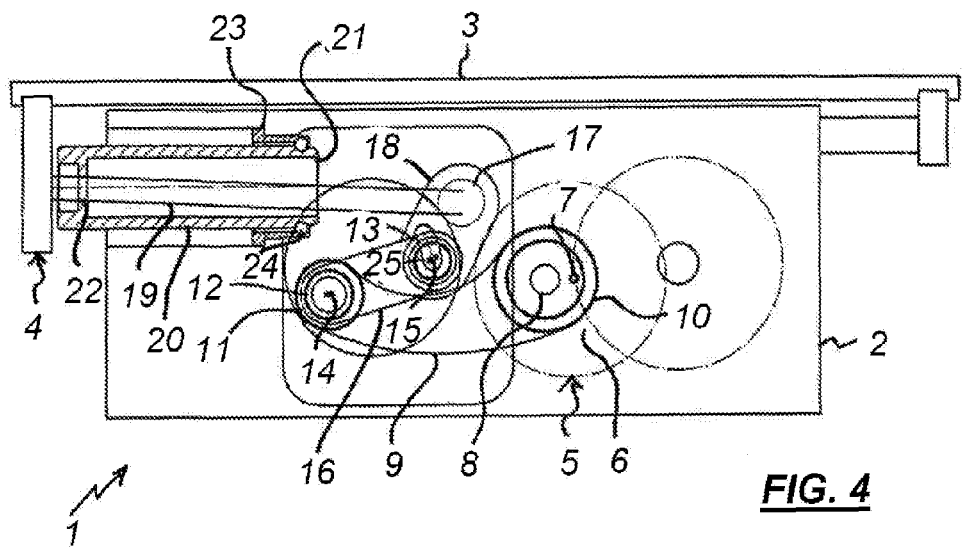
Figure 5:
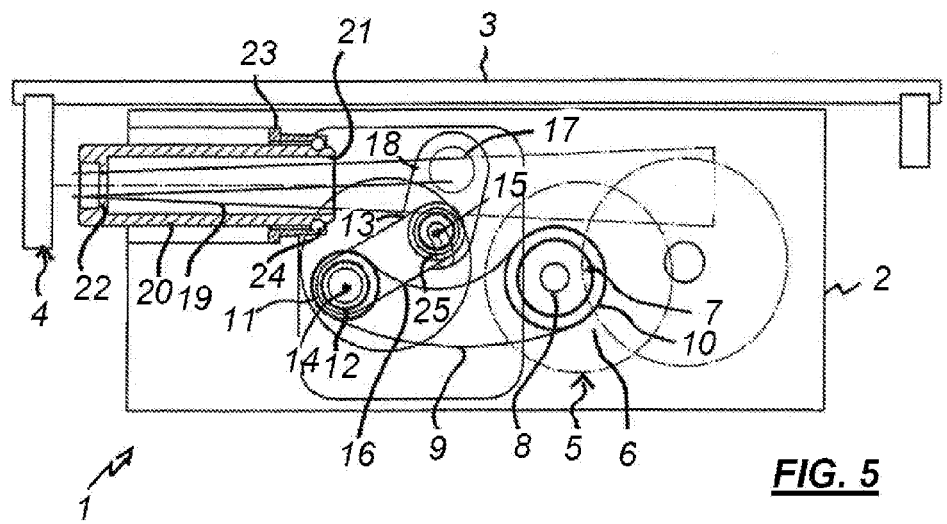
Figure 6:
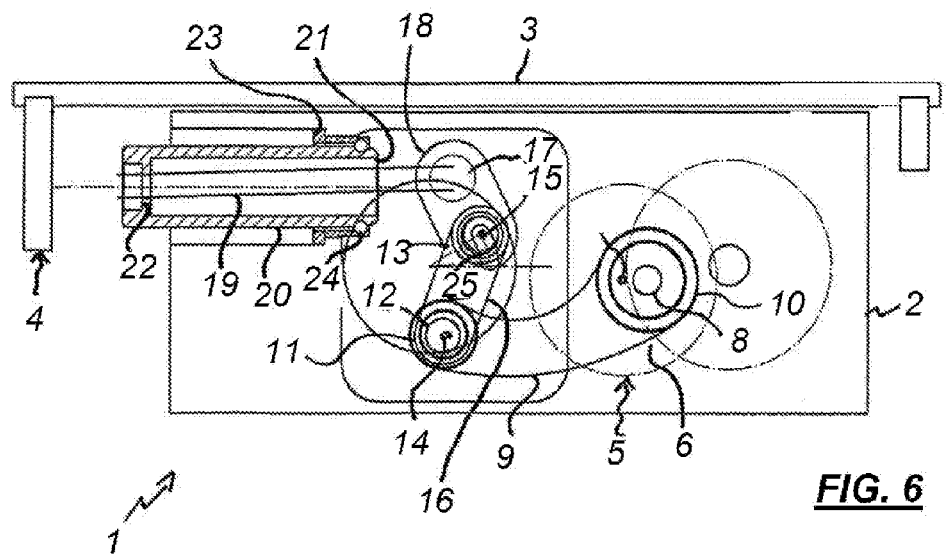

Now reference is being had specifically to the remaining FIGS. 3-6. In these FIGS. 3 and 4 show extreme positions for displacing of objects on the conveying element 3 with higher speed and FIGS. 5 and 6 show extreme positions for displacing of objects on the conveying element 3 with lower speed. The displacement direction in both cases is to the right in the figures, provided that the crank 6 rotates clockwise. If the crank rotates in the opposite direction, the object displacement direction is reversed.

FIGS. 3-6 clearly show that the rocker 13 has a second rocker arm 18, which is angled in relation to the first rocker arm 13. In addition, it is clearly shown that these arms 13, 18 are of different length; in the case at hand of the relationship is 2:1. This contributes, just like the gearing described above, to the achievement of an ideal gearing ratio.

The second pivot pin 17 of the second rocker arm 18 is indirectly pivotally connected with the conveying element 3 via a first, inner end of a rod 19, which is shown but schematically and has a second, outer end connected to the conveying element 3. On a distance expanding between the ends of the rod 19, the rod runs through a sleeve 20, which has a wide orifice 21 in the direction of the inner rod end. The orifice has such a size that working movements of the rod 19 transversely to the sleeve 20 can be taken up without collisions. Towards the outer rod end the sleeve 20 has a packing box 22, through which the rod 19 runs in a liquid tight manner. In addition, the sleeve 20 at the end with the orifice 21 is enclosed by a tubular carrier 23, which elastically holds the sleeve 20 by means of an O-ring 24, that is arranged in corresponding grooves on the outside of the sleeve 20 and the inside the carrier 23. An arrangement like this renders it possible to form a liquid tight housing for the crank mechanism 5, a housing in which oil can be present for reliable lubrication of the crank mechanism 5.

Finally, a more detailed description will be given of the preferred solution for displacing the pendulum pin 15. Again we refer primarily to FIGS. 3-6. In these is clearly shown a circle arc 25, which is turned away from the axis of rotation 7 and has a circle axis in parallel with the axis of rotation 7. Along this circle arc the pendulum pin 15 is displaceable from the outside of the oscillating conveyor 1, preferably by means of a knob or by using an appropriate tool, such as an Allen wrench. By displacement of the pendulum pin 15 according to the above it is rendered possible easily to alter a feed rate of the oscillating conveyor from rapid as shown in FIGS. 3-4 (extremely small minimum distance between the pendulum pin 15 and connecting rod 9) to slow as shown in FIGS. 5-6 (slightly larger minimal distance between the pendulum pin 15 and connecting rod 9). In doing so, for achieving a maximum feed rate it can be advantageous if the connecting rod 9 is, as shown, curved, because that provides for an extension of the maximum possible displacement range for the pendulum pin 14.

The person skilled in the art is aware that the embodiment described above can be varied in different ways within the scope of the claims and that solutions with differently designed crank mechanism geometries are conceivable.

The invention claimed is:

1. Oscillating conveyor, comprising:
   a support;
   a conveying element, arranged to carry objects to be moved and supported by the support to be displaceable between a first extreme position and a second extreme position; and
   a driving device, arranged on the support to displace the conveying element relatively slowly to the first extreme position and to displace the conveying element relatively quickly to the second extreme position in order thereby to achieve a movement of the objects in a direction which corresponds to a displacement direction of the conveying element from the second extreme position to the first extreme position, the driving device including a crank mechanism, the crank mechanism including
   a crank, rotatable about an axis of rotation,
   a crank pin arranged at a distance from the axis of rotation and in parallel therewith,
   a connecting rod, including a first end connected to the crank pin and turning thereabout and a second end connected to a first pivot pin on a rocker and turning about a pivot axis in parallel with the rotary shaft, said rocker being rotatingly mounted on a pendulum pin in parallel with the axis of rotation and including said first pivot pin on a first rocker arm and a second pivot pin pivotally connected to the conveying element to cause the desired displacement thereof,
   wherein the crank pin, the first pivot pin and the pendulum pin jointly define a triangle, in which, when the crank rotates, a length of a side between the crank pin and the pendulum pin varies, causing an variation of the triangle angles,
   wherein the pendulum pin is mounted in such a way in relation to the axis of rotation that, when the crank rotates, the angle at a corner of the pendulum pin varies within an angular range being either obtuse or acute, resulting in the desired displacement of the conveying element at different speeds, and
   wherein the position of the pendulum pin in relation to the rotational axis is adjustable, thus enabling a variation of the displacement speed of the conveying element.

2. The oscillating conveyor of claim 1, wherein the rocker includes a second rocker arm, on which said second pivot pin is provided.

3. The oscillating conveyor of claim 2, wherein both arms of the rocker are arranged at an angle in relation to each other.

4. The oscillating conveyor of claim 1, wherein said second pivot pin is indirectly pivotally connected to the conveying element via a first, inner end of a rod, which includes a second, outer end, is connected to the conveying element.

5. The oscillating conveyor of claim 4, wherein the rod, on a segment situated between the rod ends extends through a sleeve, which, in a direction towards the inner rod end, includes an orifice, which is dimensioned such that it without collision can take up working movements of the rod traversal to the sleeve, and which, in a direction towards the outer rod end, includes a packing box, through which the rod runs in a liquid tight manner.

6. The oscillating conveyor of claim 5, wherein the sleeve at the end with the orifice is surrounded by a tubular carrier, which resiliently holds the sleeve by way of an O-ring, arranged in a corresponding groove on the outside of the sleeve and the inside of the carrier.

7. The oscillating conveyor of claim 5, wherein the crank mechanism is arranged in a liquid tight housing, in which there is oil for lubricating of the crank mechanism.

8. The oscillating conveyor of claim 1, wherein the pendulum pin is displaceable along a circle arc, which is facing away from said rotational axis and has a circle axis in parallel therewith.

9. The oscillating conveyor of claim 8, wherein the pendulum pin is displaceable from the outside of the oscillating conveyor by way of a knob.

10. The oscillating conveyor of claim 9, wherein the connecting rod is curved in order to expand a possible displacement field of the pendulum pin.

11. The oscillating conveyor of claim 1, wherein the connecting rod is curved in order to expand a possible displacement field of the pendulum pin.

12. The oscillating conveyor of claim 2, wherein said second pivot pin is indirectly pivotally connected to the conveying element via a first, inner end of a rod, which includes a second, outer end, connected to the conveying element.

13. The oscillating conveyor of claim 12, wherein the rod, on a segment situated between the rod ends extends through a sleeve, which, in a direction towards the inner rod end, includes an orifice, which is dimensioned such that it without collision can take up working movements of the rod traversal to the sleeve, and which, in a direction towards the outer rod end, includes a packing box, through which the rod runs in a liquid tight manner.

14. The oscillating conveyor of claim 3, wherein said second pivot pin is indirectly pivotally connected to the conveying element via a first, inner end of a rod, which includes a second, outer end, connected to the conveying element.

15. The oscillating conveyor of claim 14, wherein the rod, on a segment situated between the rod ends extends through a sleeve, which, in a direction towards the inner rod end, includes an orifice, which is dimensioned such that it without collision can take up working movements of the rod traversal to the sleeve, and which, in a direction towards the outer rod end, includes a packing box, through which the rod runs in a liquid tight manner.

16. The oscillating conveyor of claim 6, wherein the crank mechanism is arranged in a liquid tight housing, in which there is oil for lubricating of the crank mechanism.

\* \* \* \* \*